United States Patent [19]
Williams

[11] Patent Number: 4,548,131
[45] Date of Patent: Oct. 22, 1985

[54] MOBILE APPARATUS FOR THE INFIELD HANDLING OF FIBROUS MATERIAL

[76] Inventor: John L. Williams, 157 Hill St., Orange, New South Wales, Australia

[21] Appl. No.: 525,893

[22] Filed: Aug. 24, 1983

[30] Foreign Application Priority Data

Aug. 25, 1982 [AU] Australia .............................. PF5559
Oct. 8, 1982 [AU] Australia .............................. PF6261

[51] Int. Cl.⁴ ........................ B30B 15/30; B65B 13/20
[52] U.S. Cl. ........................................ 100/1; 19/80 R; 100/3; 100/70 A; 100/96; 100/100; 100/215; 100/218; 100/295
[58] Field of Search .................... 100/94, 95, 96, 215, 100/295, 255, 218, 100, 3, 70 A, 1, 97; 19/80 R, 80 A

[56] References Cited

U.S. PATENT DOCUMENTS

| | | | |
|---|---|---|---|
| 1,314,437 | 8/1919 | Silverthorne ...................... | 100/215 |
| 3,145,647 | 8/1964 | Dinkov ............................. | 100/215 X |
| 3,280,727 | 10/1966 | Jonas ............................... | 100/218 X |
| 3,557,683 | 1/1971 | Boyd .............................. | 100/100 X |
| 3,651,755 | 3/1972 | Gati ................................ | 100/215 X |
| 3,771,673 | 11/1973 | Moeller ........................... | 100/218 X |
| 3,897,018 | 7/1975 | Wilkes ............................ | 19/80 R X |

Primary Examiner—Billy J. Wilhite
Attorney, Agent, or Firm—Watson, Cole, Grindle & Watson

[57] ABSTRACT

A mobile apparatus for the "in-field" production of compact bales of fibrous material, particularly picked cotton, the apparatus including a bin into which the fibrous material can be deposited, a series of beaters near one end of the bin which are capable of dispersing the fibrous material, a movable wall for moving the fibrous material in the bin towards the beaters, a duct extending from at a point near the beaters to a baling hopper, a blower for creating an air stream for conveying the dispersed fibrous material through the duct, and a press ram for compacting the dispersed fibrous material in the baling hopper into compact bales.

7 Claims, 2 Drawing Figures

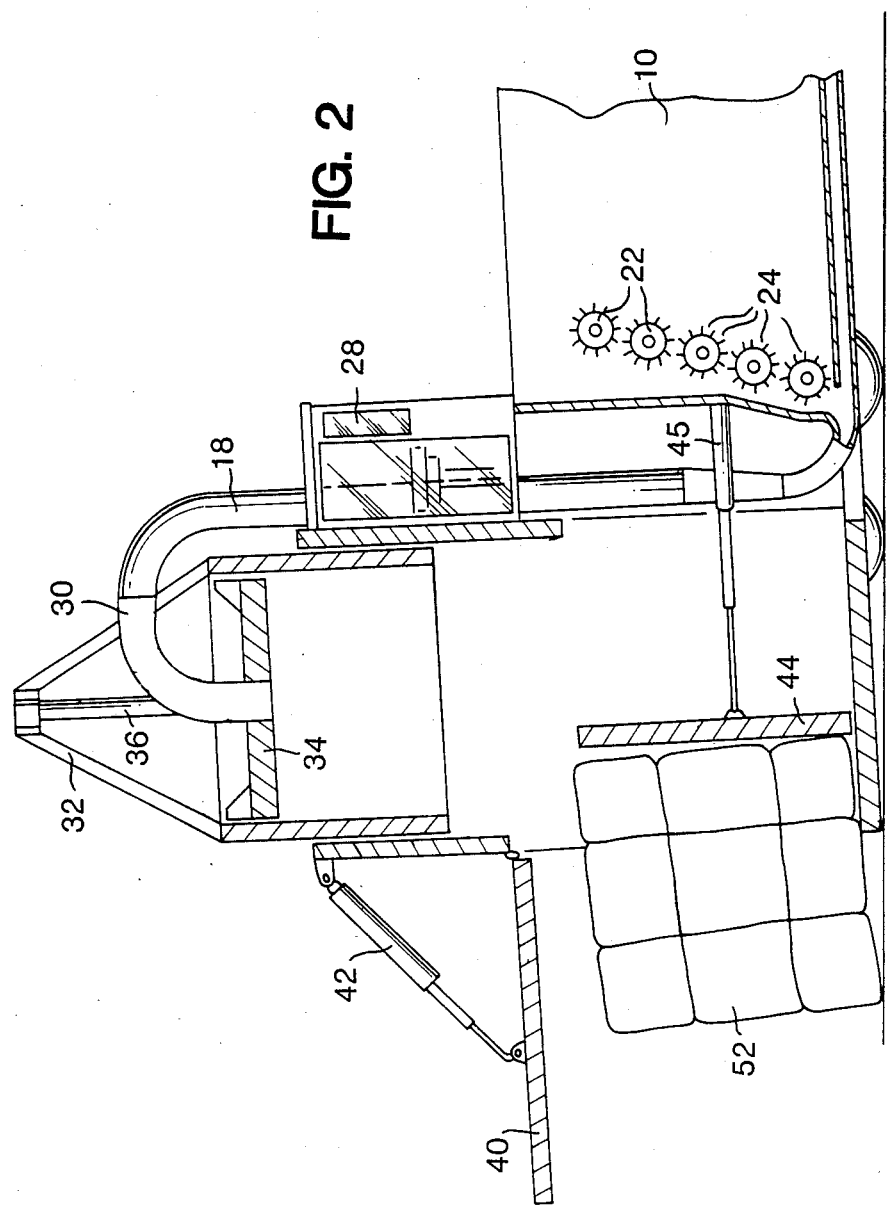

4,548,131

MOBILE APPARATUS FOR THE INFIELD HANDLING OF FIBROUS MATERIAL

BACKGROUND OF THE INVENTION

This invention relates to an apparatus for the handling fibrous material.

In one aspect the invention provides an apparatus for handling fibrous material such as cotton in the form as provided by a mechanical harvesting machine.

In another aspect the invention provides an apparatus for handling picked cotton "in-field". In this aspect the apparatus is provided with wheels and is either towable or self-propelled.

Already known in the area of cotton handling "in-field" is apparatus sometimes referred to as a cotton module. Picked cotton is placed into the cotton module, which is open-floored, and compressed downwardly within the confines of the walls of the module. When no further cotton can be compressed into the module, the back wall of the module is opened and the module is moved forward having a loosely compacted block of cotton sitting on the ground.

The cotton module has a number of problems and disadvantages associated with its use, related mainly to the difficulties which arise when subsequently handling the loosely packed blocks of cotton during relocation from the cotton field and during storage prior to treatment at the cotton gin. In the removal and storage of cotton as handled by a cotton module apparatus, a significant loss of cotton occurs, both "in-field" and by way of deterioration, as storage is almost always in the open at the cotton gin.

Another disadvantage with a cotton module apparatus is that the amount of compression able to be applied to the cotton is limited by the weight of the apparatus, and only a very uneven compaction is possible due to the nature of picked cotton, which tends to form sticky lumps in the collection hopper of the cotton picking machine.

It is an object of the present invention to provide apparatus for handling fibrous material which is convenient to use and which provides a readily handled bale of compressed material.

It is a further object to provide apparatus for handling picked cotton which may be used "in-field", which reduces the amount of handling required for cotton after picking, and which provides an improved bale of cotton which is readily handled by conventional means, the bale being substantially more weather resistant than those provided by previously available apparatus.

SUMMARY OF THE INVENTION

In its broadest form the invention provides an apparatus for handling fibrous material which comprises means to move the fibrous material to means which physically disperses it to a desired form; the material being then conveyed by means of entrainment in an air stream to a baling hopper; means for compressing the fibrous material in the hopper; means for securing the compressed fibrous material in its compressed form; and means for discharging the compressed bale.

In one embodiment of the invention the apparatus includes a storage bin and means for moving fibrous material within the bin towards a plurality of beaters having a plurality of tynes thereon; the beaters dispersing the fibrous material into a loosely associated, substantially homogenous form. The fibrous material is then carried by means, which includes air flow generating means, to the inlet of a baling hopper, compression means are associated with the baling hopper to compress the fibrous material in one or more stages, means are provided to secure the compressed fibrous material in that form, together with means to discharge the secured compressed bale of fibrous material from the apparatus.

In another embodiment of the invention the apparatus is suitable for installation in existing equipment in which a storage bin or hopper is available for receiving fibrous material.

In accordance with the invention it is possible to reduce the amount of handling of fibrous materials by providing means which enables a substantially greater compaction rate of the material. This has been achieved by the realization that greater compaction is possible where the material is substantially homogenous, rather than a lumpy conglomerate of relatively compressible and incompressible material.

The apparatus of the invention is particularly suitable for handling cotton as picked by a mechanical cotton picking machine and the further reference to embodiments of the invention will be to the handling of cotton, although it will be understood that such description is in no way limiting on the scope of the invention.

The means provided in the storage bin for moving cotton towards the means for dispersing it is conveniently a false end wall in the storage bin which moves towards the dispersing means, thus carrying the cotton in front of it. It may also be a series of endless chain drives provided on the floor of the storage bin or an endless track floor on the bin, as desired.

The means for physically dispersing the cotton into a loose and substantially homogenous form is preferably a series of horizontally mounted, elongated, rotating beaters each having a plurality of tynes thereon, the beaters being positioned one above the other, although not necessarily directly above each other, at one end of the storage bin.

The invention will now be further described with reference to a particularly preferred construction of the apparatus of the invention as illustrated in the following drawings.

DESCRIPTION OF THE DRAWING

FIG. 2 shows the apparatus of FIG. 1 in a different stage of operation.

DETAILED DESCRIPTION OF THE PREFERRED EMBODIMENT

Figure 1:
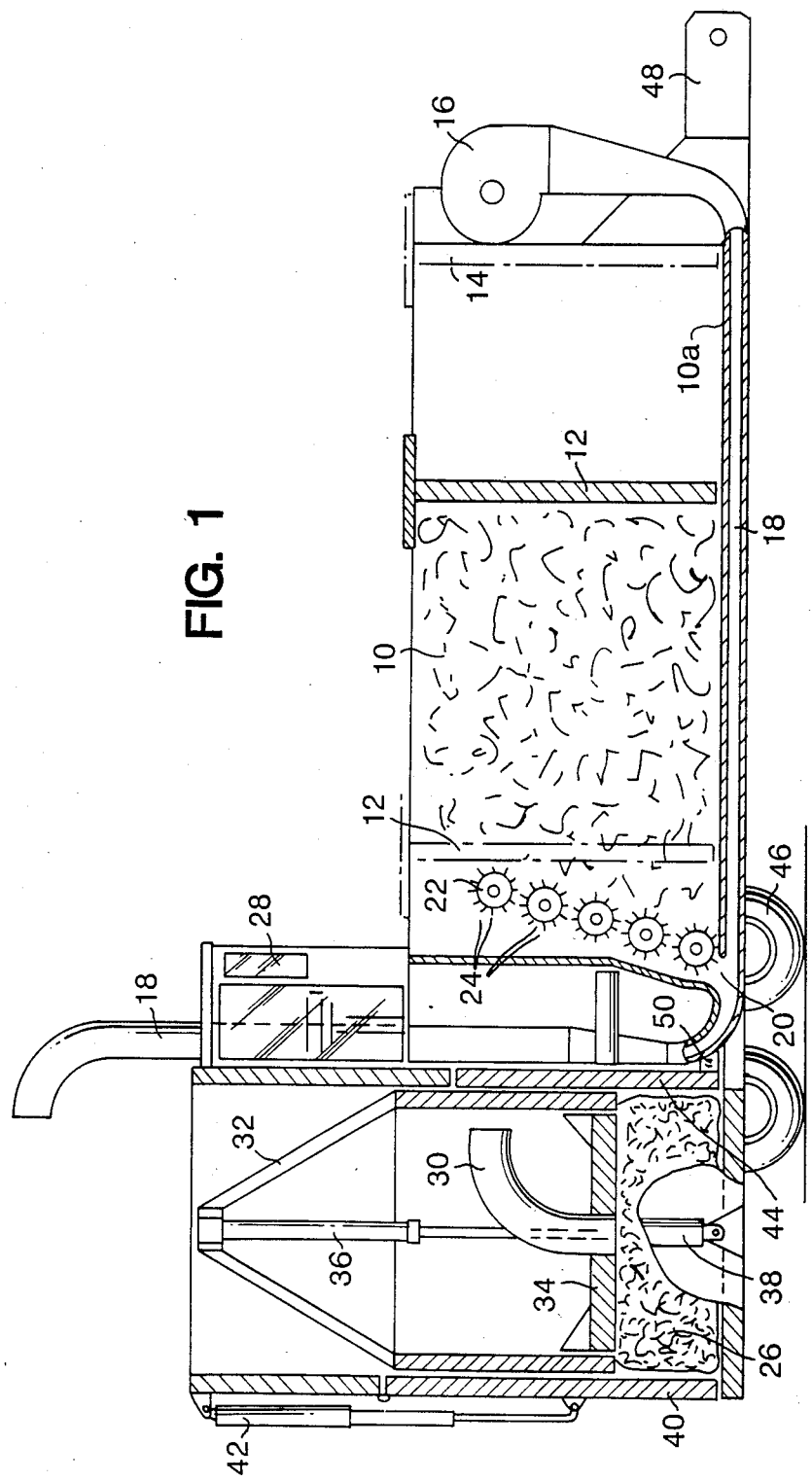
FIG. 1 is a schematic representation of cotton handling apparatus in accordance with a preferred embodiment of the invention.

Referring to FIGS. 1 and 2 there is shown an apparatus in accordance with the invention having a cotton receiving bin 10 into which cotton picked by a mechanical cotton picking machine is placed. Bin 10 has a floor 10a, and located therein is a movable end wall 12, supported and guided by roller assemblies (not shown) which engage with the walls of bin 10. Wall 12 is moved by a pair of roller chain drives, one on each side of bin 10, which are connected to a common shaft driven by a hydraulic motor through two gear boxes (the roller chain drives and the motor driven gear boxes are not shown for the sake of clarity). Wall 12 is able to move forward and backwards in bin 10, as required, and, in dotted outline at 14, is shown in its position wherein the bin has its maximum volume.

The bin 10 is approximately 15 foot in length, which is a suitable size to accept cotton from either two or four row mechanical cotton picking machines.

An air blower 16 is provided at the front of the apparatus and is driven by a hydraulic motor (not shown). Air generated by the blower is directed through duct 18 under the floor 10a of bin 10 and past an outlet 20 behind beaters 22. The outlet 20 forms an inlet mouth of the duct 18.

Five beaters 22 are provided at the rear end of bin 10 and consist of tubular cylinders mounted on bearings in the walls of bin 10. Each tubular cylinder has a plurality of tynes 24 projecting therefrom. Beaters 22 are rotated by hydraulic motors (not shown), and as the cotton in bin 10 is moved towards beaters 22 by movement of end wall 12, the tynes 24 break up the cotton into a plurality of loose pieces to form a substantially homogeneous and continuous supply of dispersed cotton pieces.

Both under the action of gravity and by inducement into the air stream in duct 18, the dispersed cotton pieces are entrained in the air stream and are carried vertically through duct 18, and past control cabin 28.

As best seen in FIG. 2, where like numbers indicate like parts, outlet mouth of duct 18 abuts a duct section 30 which extends upwardly through the platten 34, i.e., when the press device 32 and press platten 34 are in the fully raised position. Dispersed cotton passes through duct section 30 and press platten 32, and into baling hopper 26, as seen in FIG. 1.

As can be seen by viewing both FIGS. 1 and 2, the compression of dispersed cotton in hopper 26 is achieved by means of a two stage pressing action. Press device 32 carries the press platten 34 which is operated by hydraulic ram 36. Also provided on the outside of baling hopper 26 are further press rams 38, as seen in FIG. 1. Two rams are provided, one on each side of baling hopper 26 and these are attached to press device 32.

By the use of this arrangement it has been found possible to adequately compress the dispersed cotton provided to baling hopper 26, and achieve the advantages set out above.

Also provided in baling hopper 26 is an eject door 40 which is openable by means of hydraulic cylinders, one of which is shown at 42, to allow removal of a compressed bale of cotton.

To assist in that removal, a movable wall 44 is provided. Movable wall 44 is supported on rollers by the floor of hopper 26 and is able to move rearwardly under the operation of a hydraulic cylinder 45.

The apparatus is provided with wheels 46, which are mounted to share the load equally and are provided on a suspension which enables them to be raised or lowered in pairs, on each side of the apparatus, to enable the apparatus to either rest of the ground, or to have sufficient clearance beneath it to negotiate the terrain over which it is proposed to be moved. A draw bar 48 is provided at the front of the apparatus to facilitate towing, and is suitable for coupling to a tractor 3 point linkage, by means of which the draw bar can be raised or lowered, when so attached.

The hydraulic motors provided on the apparatus and referred to above are suitably powered by a hydraulic pump driven by the power take-off of a tractor used to tow and position the apparatus "in-field".

The inventive apparatus is operated as follows.

Cotton as picked by a mechanical cotton picking machine is dumped into bin 10. At this time end wall 12 is in its most forward position, as shown in dotted outline at 14. A check is made to ensure that eject door 40 and movable wall 44 are in the position shown in FIG. 1, and press device 32 and press platten 34 are in a fully raised position, that is, are in the position where duct 30 is aligned with duct 18.

Blower 16 and the motors connected to beaters 22 are started up. The motor connected to the chain drives for wall 12 is started, i.e., to commence the movement of wall 12 towards beaters 22. The cotton in bin 10 is urged onto beaters 22 which disperse the cotton into a loose and substantially homogeneous form. The loose cotton leaving beaters 22 meets the end wall of bin 10 and drops down, and through outlet 20 into the air stream provided by blower 16 in duct 18. The air stream carries the dispersed cotton up through duct 18, into duct 30 and down into baling hopper 26.

The operator in control cabin 28 is able to determine when the hopper 26 is filled with dispersed cotton, and, when that occurs, beaters 22, blower 16 and the motor moving wall 12 are stopped. Rams 38 are activated to pull press device 32 down to its maximum travel (as shown in FIG. 1) and then ram 36 is actuated to move press platten 34 down to its maximum travel (again, as shown in FIG. 1).

Sponge locks or other similar acting devices are provided in the walls of baling hopper 26 to retain the compressed cotton in as compressed a form as possible, upon the raising of press platten 34 and press device 32, which are repositioned in the fully raised position, as shown in FIG. 2.

When that has occurred the operator is able to start up beaters 22, blowers 16 and the motor moving wall 12 once again. More cotton is urged onto beaters 22 to be dispersed and entrained in the duct 18, and carried into baling hopper 26.

The procedure of filling hopper 26; stopping the dispersing of cotton; compressing the cotton in hopper 26 and then refilling hopper 26; is repeated until, under maximum compression, the cotton forms a bale approximately 8 foot in height. With this apparatus it has been found possible to achieve the desired compaction with three fillings and compressions of hopper 26. When the optimum size bale is achieved under maximum compression, the bale is secured in its compressed form by tape from a number of tape reels, one of which is shown at 50. The baling of the compressed cotton is achieved by conventional means and further description of this aspect is considered unnecessary to those skilled in the art.

Once the baling of the cotton has been completed, press device 32 and press platten 34 are returned to their raised positions. Eject door 40 is unlocked and hydraulic cylinder 42 is actuated to open eject door 40 to the position as shown in FIG. 2. Wheels 46 are lowered until the apparatus is clear of the ground and in a condition for towing. The hydraulic cylinders operating movable wall 44 are actuated and wall 44 moves rearwardly, taking with it bale 52 of cotton.

Simultaneously, the apparatus is towed slowly forward so that bale 52 is deposited on the ground and the apparatus is towed clear of the bale so that eject door 40 may be closed.

As will be appreciated by those skilled in the art, for any of the time blower 16 and beaters 22 are inoperative, further cotton may be placed in bin 10, after the step of reversing the movement of wall 12 to reposition it as shown in outline at 14.

Thus, it will be seen that the invention provides apparatus suitable for the "in-field" handling of picked cotton, which enables the load from a conventional mechanical cotton picking machine to be received and handled to provide a bale, of 8 foot dimensions, of bound cotton.

It has been found that such a bale of cotton weighs on the order of 5 tons, and it has not previously been possible to achieve such a bale with equipment previously existing. The advantages of the bale produced by the apparatus of this invention are that its dimensions are such that it is easily handled by conventional bulk handling means, such as a fork lift truck, and that due to the degree of compression achieved in the apparatus, it is far superior in resisting deterioration by the weather when stored at the cotton gin. Additionally, both the apparatus and the conventional bulk handling means may be readily used under the adverse conditions which may exist "in-field". Thus, the operation of transporting picked cotton to the cotton gin is relatively easily accomplished and the substantial losses of cotton which occurred with previous apparatus is avoided.

What I claim is:

1. A vehicle for the in-field processing of cotton which is in a form as picked by a mechanical cotton picker, said vehicle comprising:
    a storage bin for the cotton, said storage bin having a floor,
    a plurality of beaters generally positioned above the floor of said storage bin for converting the cotton therein into loose, substantially homogeneous cotton pieces, said beaters being located generally vertically above one another,
    movable means within said storage bin for moving the cotton therein toward said plurality of beaters,
    a cotton compacting means,
    means associated with said cotton compacting means for storing strapping which can be used to secure the loose, substantially homogeneous cotton pieces after being compacted in said cotton compacting means,
    a duct means for conveying the loose, substantially homogeneous cotton pieces falling to the floor of said storage bin to said cotton compacting means, and
    an air blower associated with said duct means for generating an air stream within said duct means that flows from said storage bin to said cotton compacting means, said air stream entraining the loose, substantially homogeneous cotton pieces entering therein.

2. The vehicle as defined in claim 1, wherein each of said plurality of beaters comprises an elongated, horizontally mounted hub having tynes extending radially outwardly therefrom.

3. The vehicle as defined in claim 1, wherein said movable means comprises a wall which is movably mounted within said storage bin to move toward and away from said plurality of beaters.

4. The vehicle as defined in claim 1, including at least two wheels enabling said vehicle to be moved from one location to another.

5. The vehicle as defined in claim 4, including a draw bar for connecting said vehicle to a tractor.

6. The vehicle as defined in claim 1, wherein said cotton compacting means comprises a hydraulic press arm.

7. The vehicle as defined in claim 5, wherein said duct means includes an inlet mouth in the floor of said storage hopper and an outlet mouth above said hydraulic press device, and wherein said hydraulic press device includes a vertically movable platten which has a duct section extending upwardly therethrough and a hydraulic ram attached to said platten, said duct section being connectable to the outlet mouth of said duct means when said platten is in its uppermost position.

* * * * *